United States Patent [19]

Aldrich

[11] 4,119,591
[45] Oct. 10, 1978

[54] FRICTION MATERIAL REINFORCED WITH STEEL AND CELLULOSE FIBERS

[75] Inventor: Francis William Aldrich, Troy, N.Y.

[73] Assignee: The Bendix Corporation, Southfield, Mich.

[21] Appl. No.: 812,541

[22] Filed: Jul. 5, 1977

[51] Int. Cl.² .............................................. C08L 1/02
[52] U.S. Cl. .................................... 260/17.2; 74/190; 188/218 R; 188/251 R; 188/251 A; 260/17.4 BB; 260/17.4 CL; 260/38; 260/42.17; 260/42.18
[58] Field of Search ................................ 260/17.2, 38

[56] References Cited
U.S. PATENT DOCUMENTS 3,684,062 8/1972 Johnson ........................... 188/251 R
3,804,701 4/1974 Bognar ............................... 260/17.2
3,835,118 9/1974 Rhee .................................... 260/38
3,922,241 11/1975 Barker et al. ...................... 260/17.2
3,959,194 5/1976 Adelmann ....................... 188/251 A Primary Examiner—Edward M. Woodberry
Attorney, Agent, or Firm—Leo H. McCormick, Jr.; Ken C. Decker

[57] ABSTRACT

An asbestos free organic base friction material for use as a friction lining of a brake. A combination of fibers selected from a group consisting of steel, cellulose, glass mineral and rayon fibers and a thermosetting resin binder are combined with cashew nut particles, elastomeric modifiers and inorganic modifiers to produce an organic base friction material having a substantial stable coefficient of friction over the normal operating range of the brake.

10 Claims, 25 Drawing Figures

ORGANIC FRICTION MATERIAL COMPOSITION

| INGREDIENTS | *TYPICAL ASBESTOS FRICTION MATERIAL FORMULAS | | NON-ASBESTOS FRICTION MATERIAL FORMULAS | | | | | | | | | | | | | | | | | | | | | |
|---|---|---|---|---|---|---|---|---|---|---|---|---|---|---|---|---|---|---|---|---|---|---|---|---|
| | A | B | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| ASBESTOS FIBER | 52 | 43 | | | | | | | | | | | | | | | | | | | | | | | | |
| STEEL FIBER | | | 5 | 5 | 8 | 8 | 8 | 8 | 8 | 5 | 5 | 8 | 8 | 8 | 8 | 8 | 8 | 8 | 8 | 15 | 5 | 5 | 8 | 8 | 8 | 8 |
| CELLULOSE FIBER | | | 7 | 7 | 10 | | 7 | 7 | 10 | 10 | 10 | | | 16 | 10 | 13 | 13 | 13 | 13 | | | | | | 25 | 15 |
| GLASS FIBER | | | | | | 5 | 3 | 3 | | | | | | | | | | | | 3 | | | | | | |
| WOOD FLOUR | | | | | | | | | | | 10 | | 10 | | | | | | | | | | | | | |
| PHENOLIC RESIN DRY | 25 | 16 | 15 | 15 | 17 | 20 | 20 | 20 | 20 | 17 | 20 | 20 | 18 | 20 | 25 | 20 | 20 | 20 | 20 | 20 | 20 | 20 | 20 | 17 | 20 | |
| PHENOLIC RESIN LIQUID | | | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 10 |
| (a) ORGANIC MODIFIERS | 22 | 34 | Ø | Ø | Ø | Ø | Ø | Ø | Ø | Ø | Ø | Ø | Ø | Ø | Ø | Ø | Ø | Ø | Ø | Ø | Ø | Ø | Ø | Ø | Ø | Ø |
| | | | 47 | 47 | 45 | 47 | 45 | 42 | 45 | 43 | 40 | 45 | 48 | 40 | 40 | 40 | 40 | 40 | 40 | 40 | 45 | 45 | 40 | 17 | | 25 |
| (b) INORGANIC MODIFIERS | 1 | 7 | (1) | (2) | (3) | (4) | (5) | (6) | (7) | (8) | (9) | (10) | (11) | (12) | (13) | (14) | (15) | (16) | (17) | (18) | (19) | (20) | (21) | (22) | (23) | (24) |
| | | | 21 | 21 | 23 | 15 | 12 | 15 | 12 | 20 | 23 | 12 | 11 | 11 | 12 | 12 | 14 | 14 | 14 | 11 | 15 | 25 | 22 | 30 | 25 | 24 |

(a)CASHEW NUT POWDER, NATURAL RUBBER, SYNTHETIC RUBBER SCRAP, LATEX, CRUDE MOLASSES, ASPHALTIC BASE MATERIAL, ETC.
(b)BARYTES, WHITING, TALC, ROTTEN STONE, WOLLASTONITE, KRYOLITE, CARBON PARTICLES, GRAPHYTE PARTICLES, CRYOLITE, IRON OXIDE, COPPER POWDER, WOLLASTONITE, KRYOLITE, ETC.

* ALL PERCENTAGES GIVEN IN VOLUME OF TOTAL COMPOSITION
Ø AT LEAST 25% OF WHICH IS CASHEW NUT POWDERS (1) AT LEAST 16% OF WHICH IS WHITING
(2) AT LEAST 16% OF WHICH IS TALC
(3) AT LEAST 10% OF WHICH IS BARYTES
(4) AT LEAST 15% OF WHICH IS BARYTES
(5) AT LEAST 12% OF WHICH IS BARYTES
(6) AT LEAST 3% OF WHICH IS CARBON
(7) AT LEAST 3% OF WHICH IS ROTTEN STONE
(8) AT LEAST 11% OF WHICH IS WHITING
(9) AT LEAST 3% OF WHICH IS KRYOLITE
(10) AT LEAST 12% OF WHICH IS BARYTES
(11) AT LEAST 11% OF WHICH IS BARYTES
(12) AT LEAST 11% OF WHICH IS BARYTES
(13) AT LEAST 12% OF WHICH IS BARYTES
(14) AT LEAST 3% OF WHICH IS CRYOLITE
(15) AT LEAST 3% OF WHICH IS ROTTEN STONE
(16) AT LEAST 3% OF WHICH IS IRON OXIDE
(17) AT LEAST 3% OF WHICH IS COPPER POWDER
(18) AT LEAST 11% OF WHICH IS BARYTES
(19) AT LEAST 5% OF WHICH IS WOLLASTONE
(20) AT LEAST 5% OF WHICH IS CARBON
(21) AT LEAST 12% OF WHICH IS BARYTES
(22) AT LEAST 10% OF WHICH IS SILANIZED MINERAL FIBER
(23) AT LEAST 25% OF WHICH IS BARYTES
(24) AT LEAST 10% OF WHICH IS CARBON

FIG. 25

FRICTION MATERIAL REINFORCED WITH STEEL AND CELLULOSE FIBERS

BACKGROUND OF THE INVENTION

Organic friction material compositions currently used in clutch and brake linings of vehicles must be capable of withstanding severe operating temperatures and dynamic pressures experienced during repeated applications. To prevent a deterioration in performance and physical degradation during an application, the linings are reinfoced by asbestos fibers randomly dispursed throughout a resin matrix. However, recent medical evidence indicates that asbestos fibers can cause health hazards of the lungs in persons exposed to asbestos fibers of the type used in the manufacture of clutch and brake lining. The health hazard is caused by the polution of the surrounding environment with small particles of asbestos during the mixing of the friction composition in a manufacturing facility.

In an effort to reduce the environment contamination by the asbestos fiber and thereby continue manufacturing asbestos based organic friction linings, a water slurry process is disclosed in U.S. patent application Ser. No. 754,477 has been evaluated. The water slurry can be transmitted throughout a manufacturing facility without contaminating the surrounding environment with asbestos fibers. However, before the friction material can be cured, the water in the slurry must be removed in order to be assured that any resulting lining has essentially the same operating characteristics as a lining made from a dry mix.

In another attempt to reduce the occupational health hazards in the manufacture of linings it has been suggested that the asbestos fiber be replaced with glass fibers.

U.S. Pat. No. 3,967,037 discloses several lining compositions utilizing fiber glass. From experimentation it has been determined that such lining compositions are acceptable, however, in admixing the ingredients the fiber glass tends to ball and thereby reduce the continuity of the friction material. In addition, when fiber glass base friction materials are mated with a steel brake rotor or drum, an unacceptable wear condition occurs.

U.S. Pat. No. 3,896,075 discloses another friction composition wherein the asbestos in an organic lining is replaced with basalt fibers. Because of the process required to reduce the mineral basalt into a fiber state, the use of such friction composition to date has not received open acceptance as a substitute for asbestos based organic friction materials.

Later as disclosed in U.S. Pat. No. 4,019,912 the reinforcing of the structure of a resulting friction lining was achieved through the use of carbon fibers. However, the pyrolysis step required to reduce the rayon or cellulose fiber to a carbon fiber would destroy the elastomers and inorganic fillers found in organic friction compositions.

SUMMARY OF THE INVENTION

I have developed an organic friction material composition consisting of an asbestos free foundation material, organic and inorganic friction modifiers retained in a matrix of a thermosetting resin. The asbestos free foundation material includes as a minimum of 3 percent steel fiber and 5 percent cellulose fiber and other fibers such as carbon, mineral and fiber glass. The steel and cellulose fibers when randomly oriented and uniformly dispursed throughout a friction lining provide sufficient strength to allow a friction lining made of the composition to withstand dynamic loadings without deteriorating under normal operating conditions.

It is therefore the object of this invention to provide an asbestos free organic friction lining with sufficient structural strength to repeatedly withstand dynamic loads without deteriorating when used in a brake lining.

It is another object of this invention to provide an organic friction material with a foundation material made up of a combination of at least 3 percent steel fiber and 5 percent cellulose fiber. The steel and cellulose fibers being dispursed throughout the friction material to uniformly distribute forces exerted on a brake lining and thereby prevent degradation thereof during repeated dynamic brake engagements.

It is another object of this invention for providing an organic friction material with a base material of steel fiber and cellulose fiber to establish a substantially uniform wear characteristic over the operating range of friction lining.

These and other objects should be apparent from reading this specification and viewing the drawing.

BRIEF DESCRIPTION OF THE DRAWING

FIG. 25 is a table illustrating non-asbestos friction material composition made according to this invention.

DETAILED DESCRIPTION OF THE INVENTION

Figure 1:
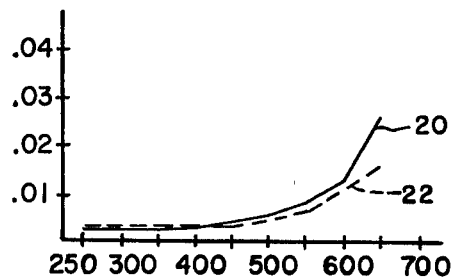
FIGS. 1-24 of the drawing are graphs comparing the wear characteristics of the non-asbestos organic friction material composition made according to this invention with a typical asbestos organic friction lining.
Figure 2:
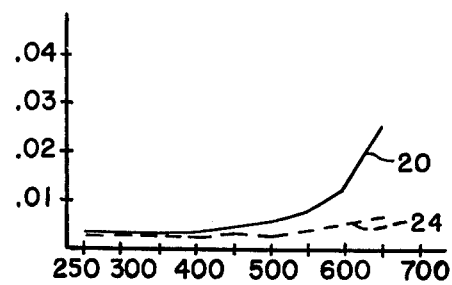
Figure 3:
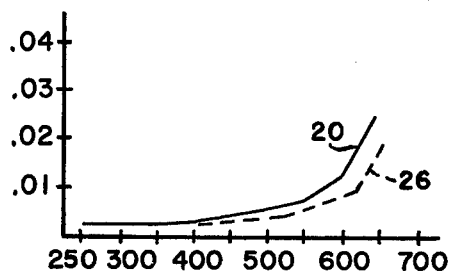
Figure 4:
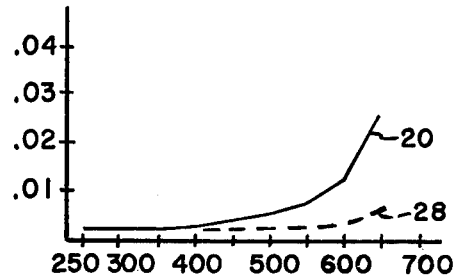

In order to evaluate the non-asbestos friction material compositions disclosed by this invention, typical asbestos base friction material compositions were used as a standard to determine the wear rate and coefficient of friction characteristics of the non-asbestos base friction material when used in a brake.

FIG. 25 illustrates the relationships of the various combinations of the fibers substituted for asbestos as disclosed by this invention.

The ingredients in the asbestos and non-asbestos friction material formulations were processed into brake friction lining in the following manner as described in detail for the base line asbestos material composition A.

The asbestos fiber, dry phenolic resin, equal parts of cashew nut powder and synthetic rubber scrap and barytes were mixed together until a homogeneous mixture was achieved. Thereafter, the mixture was placed in a mold and compacted into a briquette. The briquette was then transferred to a press and compressed by a force of about 5,000 pounds per square inch while the temperature of the briquette was raised to about 250° F. temperature. The 250° F. causes the phenolic resin to flow throughout the mixture and establish a matrix for holding the other ingredients in a fixed position. The briquette was then transferred to a curing oven having a temperature of about 500° F. to further set the resin. The briquette was then ground to a specific size corresponding to a brake pad. This brake pad was then placed on a dynamometer and from the tests performed thereon it was established that the composition Formula A had an average coefficient of friction of 0.36 at 450° F. and a wear rate as illustrated by base line 20 shown in FIGS. 1-9, 20 and 21.

In order to establish a broader base for evaluating the non-asbestos friction material compositions, a second asbestos friction material identified as Formula B was compounded. In Formula B the large amount of asbestos in Formula A is replaced by additional cashew friction powder and a filler of graphite particles to produce a brake lining. The average coefficient of friction of Formula B a brake pad made from, using the same dynamometer test as used to evaluate Formula A was found to be 0.35 and the wear rate is illustrated by line 21 in FIGS. 10-19 and 22-24.

Upon initial evaluation of the non-asbestos friction materials it became evident that the removal of asbestos from the mixture left the remaining ingredients in a dry crumbly state during the briquette forming stage. Therefore, it was necessary to add part of the phenolic resin as a liquid to all the non-asbestos composition in order to produce a composition capable of being handled as a preformed briquette.

The non-asbestos friction material composition No. 1 shown in FIG. 25 wherein a combination of steel fiber and cellulose fiber were substituted for the asbestos fiber was formulated in the same manner as Formula A and formed into a brake lining. When the dynamometer tests were performed, composition No. 1 had an average coefficient of friction 0.34 at 450° F. and a wear rate illustrated by line 22 in FIG. 1. As can be seen, the wear rate approaches that of the asbestos material of Formula a, which is currently accepted by the vehicle industry.

In order to establish a group of inorganic fillers accepable for use in a non-asbestos friction material, talc was substituted for the whiting of composition No. 1 and composition No. 2 shown in FIG. 25 was established. The dynamometer test for the brake lining made from composition No. 2 indicated than an average coefficient of friction of 0.30 at 450° F. and a wear rate as illustrated by line 24 in FIG. 2 could be expected from this composition.

Because of the availability of barytes and its low cost, a series of compositions including barytes were developed.

As shown in FIG. 25, composition No. 3 was formulated. When the brake lining made from composition No. 3 was evaluated by the dynamometer test a coefficient of friction of 0.31 at 450° F. was obtained and a wear rate illustrated by line 26 in FIG. 3 was produced.

Even though the wear rate of composition No. 3 could be expected to be better than that of Formula A, it was felt that the coefficient of friction could be improved through the addition of either a different filler or fiber material. Through experimentation it was determined that glass fiber has a higher coefficient of friction than cellulose fiber. Therefore, glass fiber was substituted for the cellulose fiber and composition No. 4 shown in FIG. 25 was produced. When the brake lining of composition No. 4 was tested through the dynamometer test, a coefficient of friction 0.35 at 450° F. was produced and a wear rate illustrated by line 28 in FIG. 4 was achieved. Unfortunately, with this amount of glass fiber in composition No. 4 surface polish or wear of a rotor or drum brake could be expected.

Therefore, the amount of glass firber was reduced and cellulose fiber added to produce composition No. 5 shown in FIG. 25. When the resulting brake lining made by composition No. 5 was evaluated in the dynamometer test, a coefficient of 0.32 at 450° F. was obtained and a wear rate illustrated by line 30 in FIG. 5 was achieved.

Figure 5:
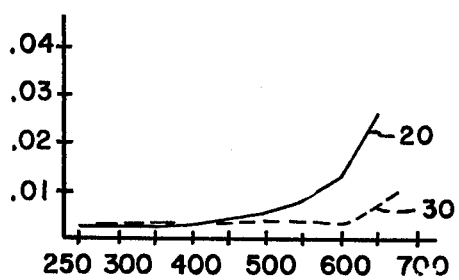
Figure 6:
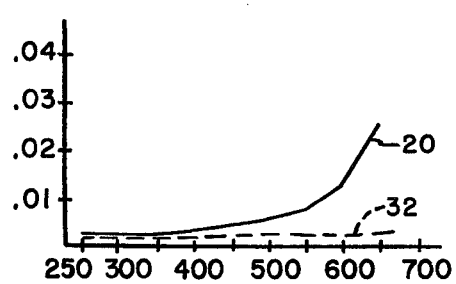
Figure 7:
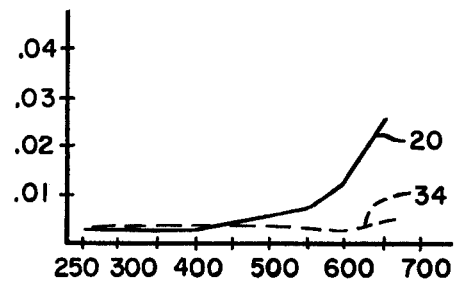
Figure 8:
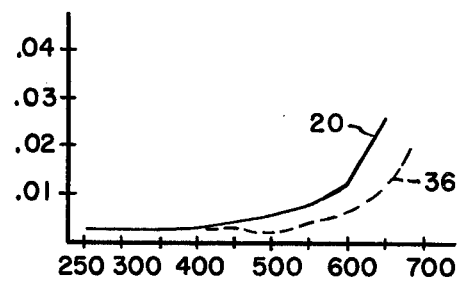
Figure 9:
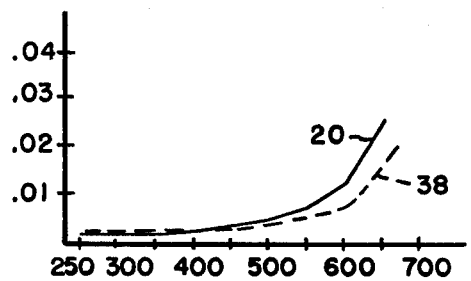
Figure 10:
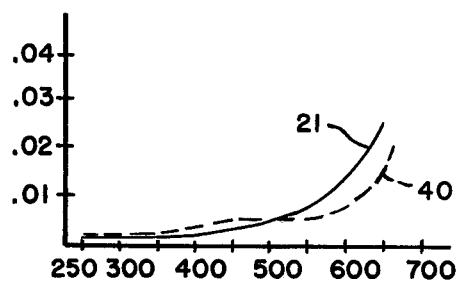
Figure 11:
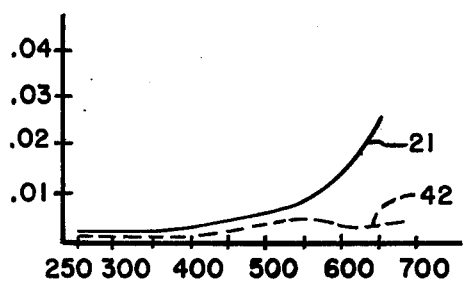
Figure 12:
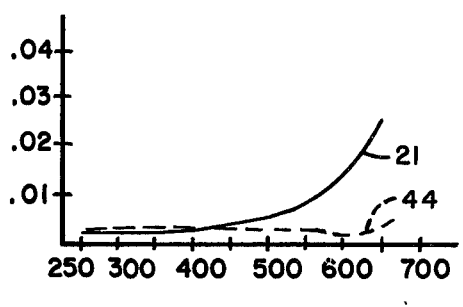
Figure 13:
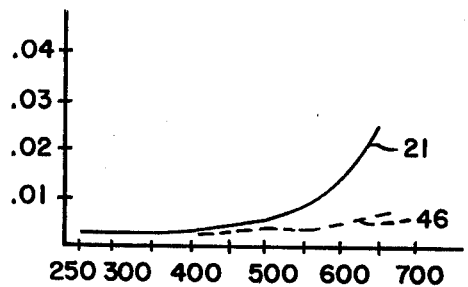
Figure 14:
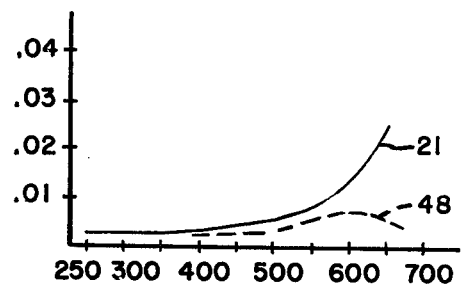
Figure 15:
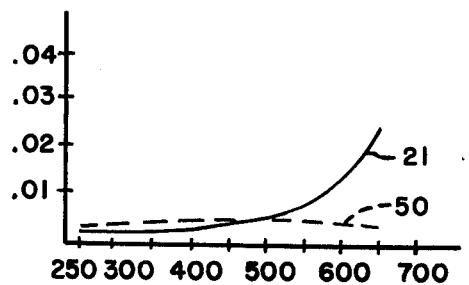
Figure 16:
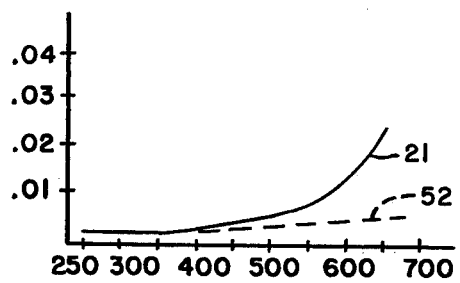
Figure 17:
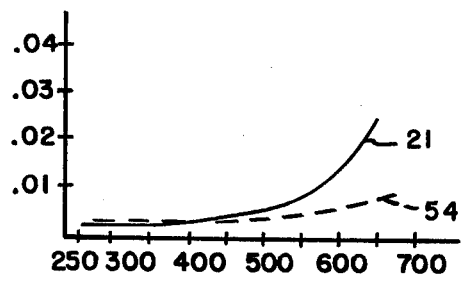
Figure 18:
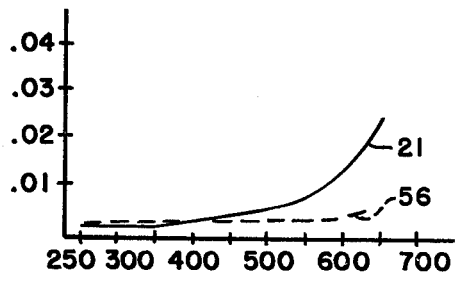

In an attempt to smooth out the wear rate of composition No. 5 as illustrated by line 30 in FIG. 5, a filler of 3% by volume of carbon was added to composition No. 5 to produce composition No. 6 in Table 1. The composition No. 6 was made into a brake friction lining and when evaluated in the dynamometer test, an average coefficient of friction of 0.28 at 450° F. was obtained and a wear rate illustrated by line 32 in FIG. 6 was produced.

In a further attempt to broaden the base for the inorganic filler modifiers, a composition No. 7 as shown in FIG. 25, was produced. In composition No. 7 a minimum of 3% by volume of rotten stone was added to the basic steel and cellulose fiber composition. When the brake lining of composition No. 7 was tested on the dynamometer and an average coefficient of friction of 0.32 at 450° F. was obtained and a wear rate as illustrated by line 34 in FIg. 7 was achieved.

In order to improve the wear rate of the non-asbestos friction material whiting was selected as the inorganic modifier, and composition No. 8 shown in FIG. 25 was produced. When the dynamometer test was run for the brake lining made from composition No. 8, an average coefficient of friction of 0.30 at 450° F. was obtained and a wear rate illustrated by line 36 in FIG. 8 was produced.

In an attempt to improve the coefficient of friction of composition No. 8 the friction producing material kryolite was added thereto to produce composition No. 9 shown in FIG. 25. When the brake lining of composition No. 9 was evaluated in the dynamometer test, an average coefficient of friction of 0.37 at 450° F. was obtained and a wear rate illustrated by line 38 in FIG. 9 was produced.

Composition No. 10 shown in FIG. 25 includes the same type ingredients as Formula B with the exception of the asbestos friction material. To establish broad base for the friction material and improve the coefficient of friction of the non-asbestos material the cellulose fiber was replaced with glass fiber. When the brake lining composition No. 10 was evaluated by the dynamometer test, an average coefficient of friction of 0.35 at 450° F. was obtained and a wear rate illustrated by line 40 in FIG. 10 was achieved. From this test it was determined that while glass fiber when added to non-asbestos friction material compositions, does increase the coefficient of friction, however, the wear rate is also increased.

Thereafter, composition No. 11 shown in FIG. 25 was developed with wood flour added in place of the glass fiber of composition No. 10. When the brake lining of composition No. 11 was evaluated through the dynamometer test, a coefficient of friction 0.37 at 450° F. was obtained and a wear rate as illustrated by line 42 in FIG. 11 was produced. From this test it was determined that cellulose type fibers when combined with steel fibers produced a more satisfactory non-asbestos friction material composition than when a single fiber material is used.

Thereafter, an attempt was made to establish the optimum limits for steel, cellulose, and other fibers when used as the foundation material for a non-asbestos friction material. Thus, composition No. 12 shown in FIG. 25 was produced. In composition No. 12, the volume of cellulose fiber was double that of the steel fiber. When the brake lining made from composition No. 12 was evaluated through the dynamometer test, a coefficient of friction of 0.35 at 450° F. was obtained and a wear rate as illustrated by line 44 in FIG. 12 was produced. Unfortunately, composition No. 12 was spongy and therefore, it was determined that the cellulose fiber should be reduced.

Thereafter, the cellulose fiber of composition No. 12 was reduced to produce composition No. 13 shown in FIG. 25. A brake lining made from composition No. 13 was evaluated in the dynamometer test, had an average coefficient of friction of 0.32 at 450° F. and a wear rate as illustrated by line 46 in FIG. 13. This composition was not spongy, however, it should be noted that the coefficient of friction was reduced.

Therefore, in order to increase the coefficient of friction, cryolite was added to the composition No. 13 and composition No. 14 shown in FIG. 25 was produced. A brake lining made from composition No. 14 was evaluated through the dynamometer test had an average coefficient of friction of 0.37 at 450° F. and a wear rate illustrated by line 48 in FIG. 14.

Since the wear rate and coefficient of friction of composition No. 14 was much improved over Formula B, the organic modifier base was expanded through the substitution of rotten stone for the cryolite to produce composition No. 15 shown in FIG. 25. When a brake lining made of composition No. 15 was evaluated through th dynamometer test, an average coefficient of friction of 0.33 at 450° F. was obtained and a wear rate illustrated by line 50 in FIG. 15 was produced.

Composition No. 14 was further expanded through the substitution of iron oxide for the cryolite to produce composition No. 16 shown in FIG. 25. When a brake lining made of composition No. 16 was evaluated through the dynamometer test, a coefficient of friction of 0.34 at 450° F. was obtained and a wear rate as illustrated by line 52 in FIG. 16 was produced.

Composition No. 14 was still further expanded through the substitution of copper powder for the cryolite and glass fiber to produce composition No. 17 shown in FIG. 25. A brake lining made from composition No. 17 when evaluated through the dynamometer test had a coefficient of friction of 0.34 at 450° F. and a wear rate as illustrated by line 54 in FIG. 17.

Composition No. 14 was still further expanded through the addition of fiber glass to the base material to produce composition No. 18 shown in FIG. 25. A brake lining made from composition No. 18 when evaluated through the dynamometer test had a coefficient of friction of 0.37 at 450° F. and a wear rate as illustrated by line 56 in FIG. 18.

In order to establish relationship between steel fiber and cellulose fiber in the non-asbestos friction material, the cellulose fiber was eliminated from the basic composition and composition No. 19 shown in FIG. 25 was produced. In an attempt to provide composition No. 19 with an adequate coefficient of friction, at least 5% by volume of Wallastonite was added to the composition. A brake lining made from composition No. 19 when evaluated through the dynamometer test, had a coefficient of friction of 0.32 at 450° F. and a wear rate illustrated by line 58 in FIG. 19.

Figure 19:
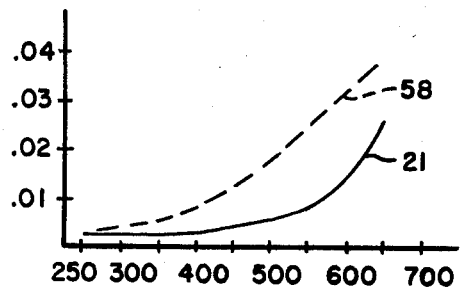
Figure 20:
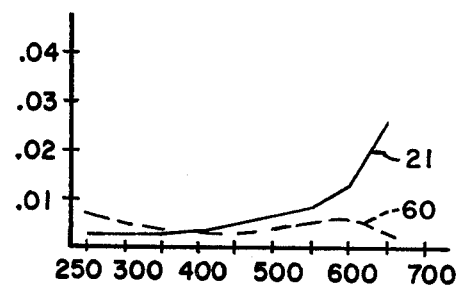
Figure 21:
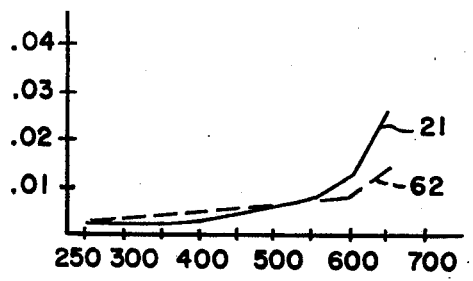
Figure 22:
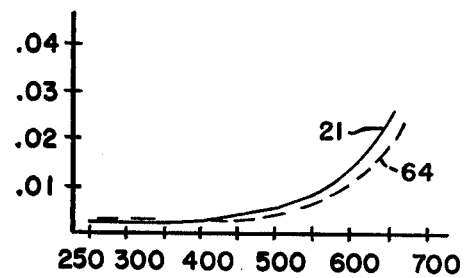
Figure 23:
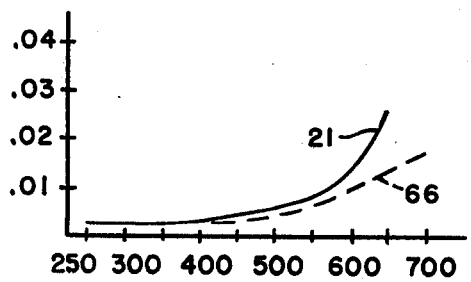
Figure 24:
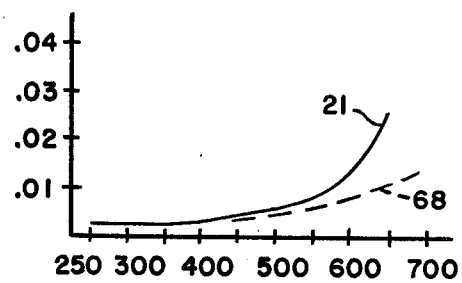

As seen in FIG. 19, the wear rate for composition No. 19 was not as good as asbestos Formula B. Thus, the steel fiber in composition No. 19 was reduced and carbon particles were added to produce composition No. 20 as shown in FIG. 25. When a brake lining made of composition No. 20 was evaluated through the dynamometer test, a coefficient of friction of 0.37 at 450° F. was obtained and a wear rate illustrated by line 60 was produced. In some applications in order to achieve structural strength in the friction lining, the carbon particles can be replaced with carbon fibers.

In a further attempt to establish a base for the inorganic friction modifiers, the volumetric percentage of the steel fiber was increased and a minimum volumetric percentage of barytes was established at 12% to produce composition No. 21 shown in FIG. 25. When a brake lining made from composition No. 21 was evaluated through the dynamometer test a coefficient of friction of 0.32 at 450° F. was obtained and a wear rate illustrated by line 62 in Fig. 21 was produced.

Thereafter, the steel fiber was maintained at 8% by volume and silanized mineral fiber was added to produce composition No. 22 shown in FIG. 25. A brake lining made from composition No. 22 was produced, and when evaluated in the dynamometer test a coefficient of friction of 0.28 at 450° F., and a wear rate as illustrated by line 64 in FIG. 22 was produced.

From the foregoing test it should be evident that the range of steel fiber should be maintained between 3 to 15 volume percent of the total mixture. However, since the optimum range of cellulose and other fibers had not been established, therefore, composition No. 23 shown in FIG. 25 was devised. In composition No. 23 the cellulose fiber was increased to a maximum of 25 percent of the total volumetric percentage of the composition while at the same time the cashew nut powder was reduced to 15%. When a brake lining made from composition No. 23 was evaluated through the dynamometer test, a coefficient of friction of 0.45 at 450° F. was obtained and a wear rate as illustrated by line 66 in FIG. 23 was produced. As seen, composition No. 3 almost matches the wear rate for currently acceptable asbestos lining and could be accepted by most vehicle manufacturers without extended qualification testing. Thus, the industry would be able to meet the Federal Clean Air and Health Standards of 1975 within the prescribed time set for compliance.

To substantiate the results of composition No. 23 another composition No. 24 shown in FIG. 25 was prepared by reducing the percentage of cellulose fiber while increasing the resin content and substituting carbon in powder form for a portion of the barytes. Thereafter, when a friction lining made from composition No. 24 was evaluated through the dynamometer test, a coefficient of friction of 0.28 at 450° F. was obtained and a wear rate as illustrated by line 68 in FIG. 24 was produced.

From the foregoing compositions it was determined that while steel and cellulose fiber produce an acceptable non-asbestos friction material, when combined together with inorganic modifiers, which can include glass, mineral and carbon fibers produce a friction material with a substantially uniform wear rate throughout the operating range of most brake linings.

I claim:

1. An organic friction material for use as a friction lining consisting of a mixture of:
8–50% by volume of a combination of non-asbestos fibers selected from a group consisting of fiber glass, mineral fiber, at least 3% by volume of steel fibers, and at least 5% by volume of cellulose fibers;
12–35% by volume of thermosetting phenolic resin;
5–35% by volume of cashew nut particles;
3–20% by volume of elastomeric modifiers; and
10–55% by volume of inorganic modifiers, said thermosetting phenolic resin being responsive to heat to form a matrix for holding said non-asbestos fibers, cashew nut particles, elastomeric modifiers and inorganic modifiers in a fixed relationship, said non-asbestos fibers and phenolic resin matrix providing structural strength for allowing the friction lining to withstand dynamic repeated engagements with a rotating member and providing a substantially uniform wear rate up to 600° F. during a dynamic engagement.

2. The organic base friction material, as recited in claim 1, wherein said phenolic resin includes at least 12% dry phenolic resin powder.

3. The organic base friction material, as recited in claim 2, wherein said phenolic resin includes up to 18% liquid phenolic resin to attenuate segregation of said elastomeric and inorganic modifiers prior to the application of heat to the mixture.

4. The organic base friction material as recited in claim 3, wherein said elastomeric modifiers is selected from a group consisting of natural and synthetic rubber scrap, natural latex, crude molasses, and asphalt.

5. The organic base friction material, as recited in claim 4, wherein said inorganic modifiers are selected from a group consisting of barytes, whiting, talc, rottenstone, wollastonite, pumice, iron oxide powder, copper oxide powder, carbon and silanized mineral particles.

6. The organic base friction material as recited in claim 1 wherein said non-asbestos fibers include up to 10% fiber glass fibers.

7. The organic base friction material, as recited in claim 1, wherein said non-asbestos fibers include up to 10% wood flour fibers.

8. The organic base friction material as recited in claim 1 wherein said non-asbestos fibers include up to 10% silanized mineral fibers.

9. The organic base friction material, as recited in claim 1 wherein said non-asbestos fibers include up to 10% carbon fibers.

10. The organic base friction material as recited in claim 1 wherein said phenolic resin includes at least 5% liquid resin.

* * * * *